United States Patent [19]

Gilman

[11] Patent Number: 5,093,997
[45] Date of Patent: Mar. 10, 1992

[54] HAND-HELD SAW, PARTICULARLY FOR HOBBYISTS

[76] Inventor: Stewart B. Gilman, 10365 Holman Ave., Los Angeles, Calif. 90024

[21] Appl. No.: 388,601

[22] Filed: Aug. 1, 1989

Related U.S. Application Data

[63] Continuation-in-part of Ser. No. 143,523, Jan. 13, 1988, abandoned.

[51] Int. Cl.$^5$ ............................................. B27B 21/00
[52] U.S. Cl. ........................................ 30/372; 30/298; 30/378
[58] Field of Search ................ 30/166 A, 296, 298, 30/232, 372, 378, 373

[56] References Cited

U.S. PATENT DOCUMENTS

| | | | |
|---|---|---|---|
| 1,108,572 | 8/1914 | Gordon | 30/232 |
| 2,608,748 | 9/1952 | Kirkwood | 30/372 |
| 3,888,006 | 6/1975 | Roberts | 30/298 |
| 4,437,237 | 3/1984 | Ducret | 30/378 |

*Primary Examiner*—Hien H. Phan
*Attorney, Agent, or Firm*—William C. Fuess

[57] ABSTRACT

A jigsaw-type saw blade, typically 6"×⅜"×⅛" stainless steel having teeth angled to saw only in a thrusting direction, is fixed to a handle, typically plastic, that engages the thumb. Two jaws of a sliding vise member each slide independently along the saw blade. A first one of the vise's jaws is biased in separation from the handle by a spring that extends coaxially about the saw blade between the jaw and handle. The remaining, second, jaw presents an external surface contoured to receive two fingers disposed in symmetrical positions on either side of the saw blade. In use for clamping and sawing, a workpiece is inserted between the vise's jaws and into a first position proximate to the saw blade while the sliding vise member is in a position extended from the handle. The handle and the second jaw are grasped and squeezed between the thumb and a two fingers, thereby simultaneously clamping and sawing the workpiece. The force of the compressed spring allows a reciprocal, return, stroke when the squeezing is relaxed. The workpiece may alternatively be held and sawed in a second position between an exterior rib of the second jaw and a saw table surface. Holding and sawing in both positions may transpire entirely by use of but a single hand.

7 Claims, 2 Drawing Sheets

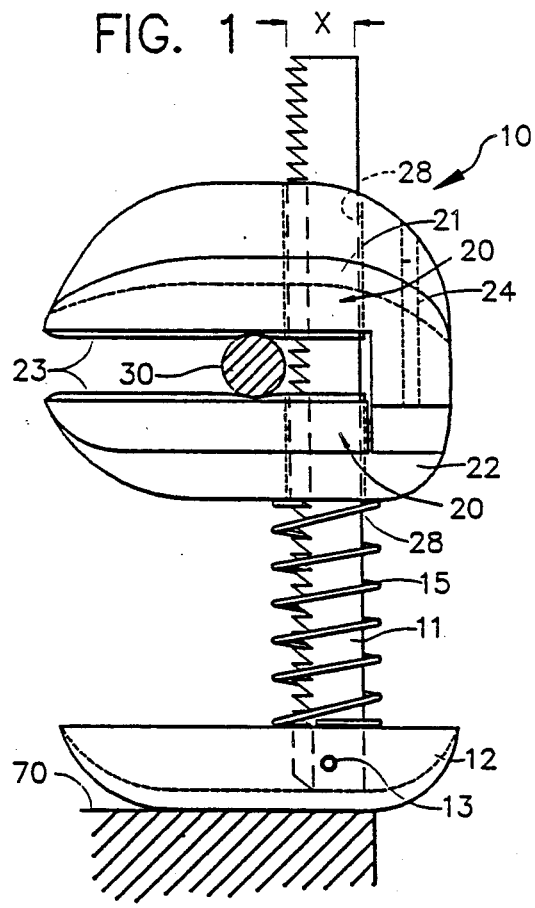
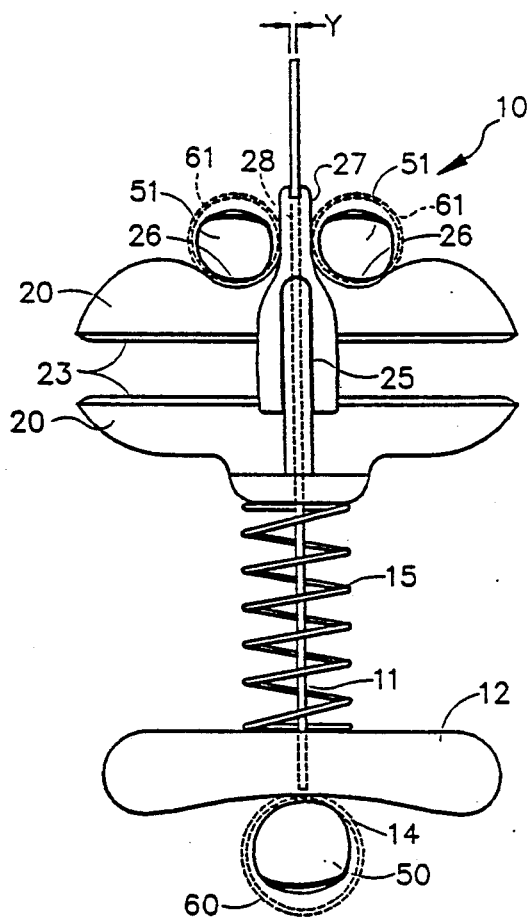
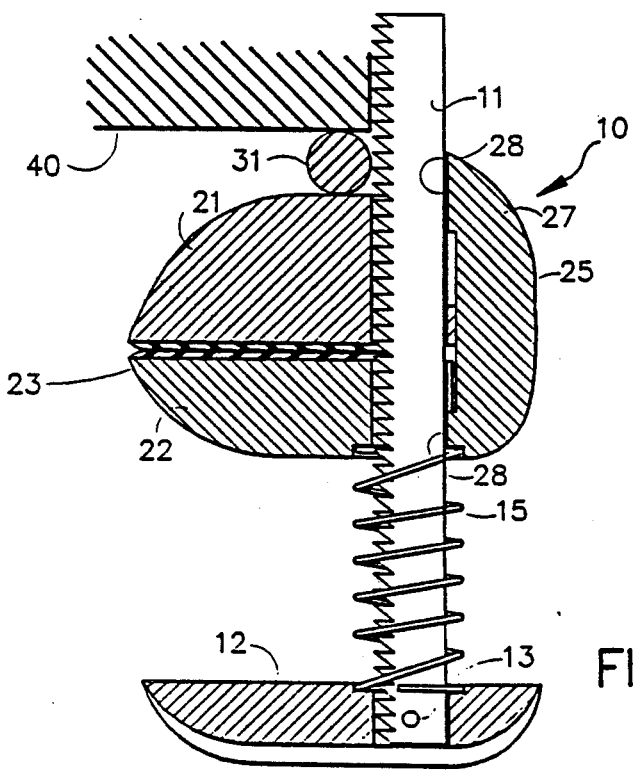

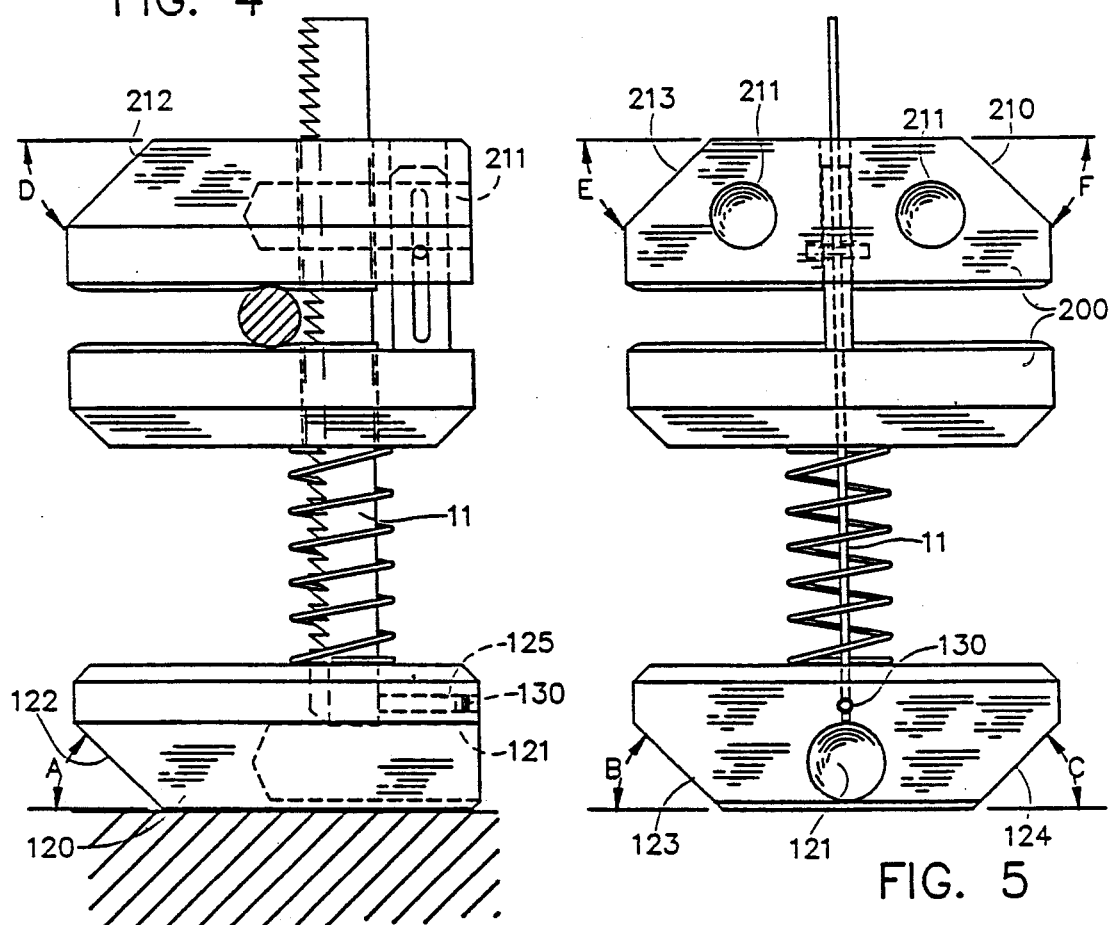
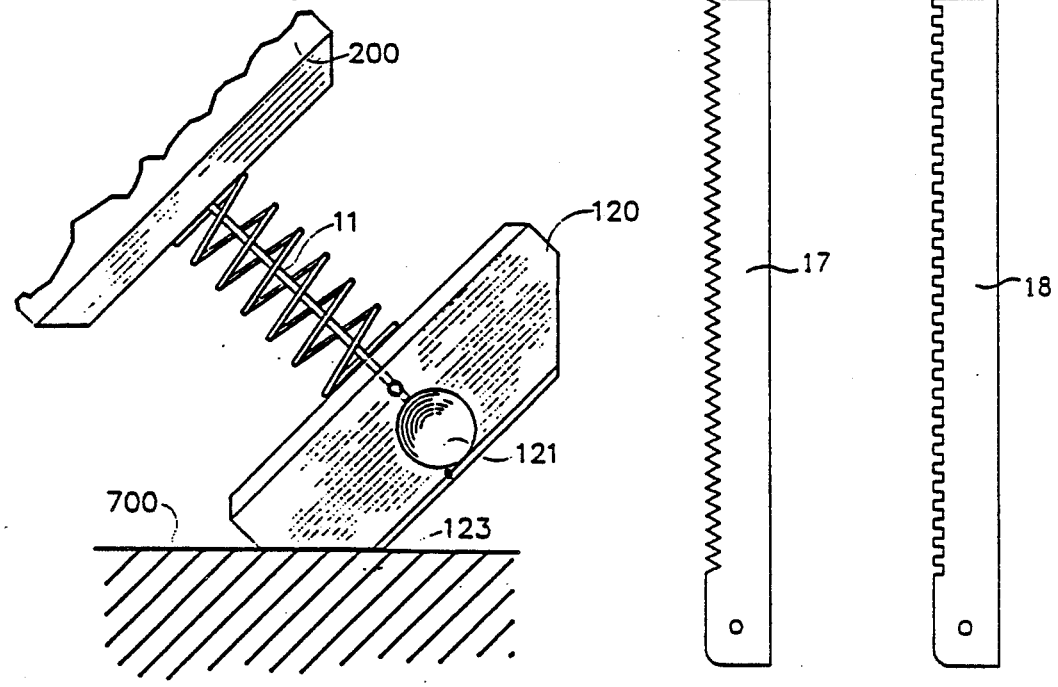

HAND-HELD SAW, PARTICULARLY FOR HOBBYISTS

REFERENCE TO RELATED PATENT APPLICATIONS

The present application is a continuation-in-part of U.S. patent application Ser. No. 07/143,523 filed Jan. 13, 1988, now abandoned.

BACKGROUND OF THE INVENTION

1. Field of the Invention

The present invention pertains to manual saws, particularly to small saws holdable in one hand. The invention particularly concerns a small hand-held saw activated by compression between the thumb and opposing fingers for both clamping and sawing or cutting materials, particularly lightweight materials such as are commonly used in crafts and hobbies.

2. Background of the Invention

Small hand-held saws are useful for cutting a variety of paper, cardboard, fabric, plastic, wood, foam and other lightweight materials. These materials are too thick or too tough to be readily severed by scissoring. Such materials are commonly used in crafts and hobbies.

A saw for craftsmens' and hobbyists' use on fairly light weight materials would preferably be light weight, relatively inexpensive, and relatively safe. It would be readily manipulatable by individuals, such as children, having only limited manual dexterity and/or strength. Despite its inexpensive construction and light weight, it would preferably be highly effective and durable in use for sawing. It would preferably be capable of readily receiving replacement saw blades. It would preferably simplify the process of cutting curves and of free form patterning.

The sawing of lightweight materials requires that the materials should be firmly held, such as in a vise, so that (i) the material is not unduly distorted by action of the sawing and (ii) the sawing may reliably proceed along a predetermined path. Materials are commonly clamped in a vise prior to commencing sawing, and are held in the vise during sawing. The positioning and clamping of a workpiece within a vise must be performed correctly. The workpiece must be aligned along the intended saw line. The workpiece must be securely held in order that the stresses induced by sawing do not cause distortion in the workpiece resulting in irregular or improper results such as a crooked saw line or nicked edge. Correct positioning and tight clamping of a workpiece in a vise prior to sawing may be especially difficult for children and other novices who have only limited planning ability, knowledge, dexterity, strength, and/or skill.

Accordingly, it is also desired, insofar as is possible, that a simple craftsmens' or hobbyists' saw for lightweight materials should also integrally incorporate a means for positioning and holding the workpiece in satisfactory alignment during the operation of sawing. This means would preferably be sufficiently simple so as to readily be operated by novices and children.

It would also be preferable if the positioning and holding could somehow be accomplished by the same forces applied from the same hand and its fingers as do otherwise accomplish the sawing. Once a workpiece was registered, inserted, or positioned to such a tool then it could be both held and sawed by the same forces.

Finally, it would be useful if the application of forces to the workpiece for holding the workpiece did not interfere with application of the same forces to the workpiece for sawing the workpiece. In particular, sawing typically involves a power stroke for cutting or slashing the workpiece and a release stroke for repositioning the saw blade for another power stroke. It is desirable that the workpiece should be pressured against the saw blade only during the power stroke, and should not be pressured against the same blade during the release stroke. Meanwhile that the forces pressuring the workpiece against the saw blade are selectively applied during the sawstrokes, it is desirable that the workpiece should be continuously securely held at least until the sawing, which normally consists of many sawstroke, is complete.

It is known to attempt the holding of a workpiece by the same tool that otherwise accomplishes sawing or cutting of the workpiece. U.S. patent Ser. No. 2,608,748 to Kirkwood for a RING SIZING TOOL shows a pliers-like sawing tool that mounts a ring workpiece during sawing. The ring workpiece is not clamped, but is abutted against a retaining lip of the tool in a position where it cannot escape a saw blade. The saw blade is forced against the ring workpiece continually during both directions of the sawstrokes.

U.S. patent Ser. No. 3,888,006 to Roberts for a CLIPPING DEVICE FOR FRUIT STEMS AND THE LIKE shows a finger operated tool that slices a fruit stem between a razor blade and an elastomeric pad. The fruit stem is not clamped, and is not subject to any more retention than simply resting on the pad except during the clipping stroke.

U.S. patent Ser. No. 4,437,237 to Ducret for a SWING SAW FOR CUTTING METAL CONDUIT shows a hand tool that clamps a workpiece conduit, and selectively clamps such conduit under hand force of the operator, for the duration of a sawing operation. A saw blade may be reciprocated under hand force of the operator while it is selectively pressured into contact with the workpiece conduit during desired portions of each sawstroke. Unfortunately, the hand force of the clamping and the hand force of the clamping and the hand force of the sawing must arise from the operator's two hands, and are not the same force arising from a one hand. The two-handed tool of Ducret thusly permits holding a workpiece conduit in a one-hand clamp while sawing the workpiece conduit with a saw registered to the workpiece with a remaining hand. The tool of the present invention, also usable to saw conduit, will be seen to accomplish the same clamping and sawing operation by use of but one hand.

SUMMARY OF THE INVENTION

The present invention is embodied in a hand-held, jigsaw-type, combination saw and vise, and also in a method of making and using such a combination saw and vise. The combination saw and vise may be, if desired, entirely held within a single hand. In this position the saw is manually operated by squeezing between the thumb and one or more opposed fingers of the hand.

In each of its two preferred embodiments, the combination saw and vise in accordance with the present invention includes a straight saw blade that is similar to a jigsaw blade. A fixed handle is fixedly attached to one end of the saw blade. At a side of the handle opposite to the attached saw blade the handle presents a surface that is contoured to engage a digit. Typically the handle's contoured surface engages the thumb of the user of the saw.

The other end of the saw blade slides within a sliding vise member having two jaws. The saw blade slides within an apertures within each of the jaws that are complementary in shape to the saw blade and that are substantially transverse to the gripping face surfaces of each jaw. An innermost jaw of the sliding vise member is located between the handle and an outermost jaw of the sliding vise member. The gripping surface of each jaw faces an equivalent surface on the other jaw. The back, non-gripping, surface of the innermost jaw faces the handle. The back, non-gripping, surface of the outermost jaw is disposed towards the exposed tip of the saw blade. The jaws slide jointly and individually along the saw blade with their gripping surfaces displaced slightly towards the toothed side of the saw blade.

The back surface of the outermost jaw (the one positioned closest to the saw blade tip) is contoured for engaging a digit or digits. Typically this contoured surface engages the saw user's index and middle fingers, these finger resting upon the jaw's back surface at positions upon either side of the saw blade.

The opposing, innermost, jaw of the sliding vise member is positionally biased by a spring. This spring is located about the saw blade in position between the innermost jaw and the fixed handle. It forces the jaw and the handle to separation.

At such times as the saw is not in use for sawing then the outermost jaw will not be pressured, such as by squeezing action of the fingers, against the innermost jaw, and the innermost jaw will not be forced against the spring. At these times the two jaws of the vise member may be slid into separation. At these times a workpiece may be received into the mouth of the vise member that is formed between the gripping surfaces of the jaws. The workpiece is positioned between the gripping surfaces of the two jaws so that it is, or may be moved laterally to be, in abutting contact with the saw blade.

During use of the combination saw and vise the handle and the outermost jaw are squeezed together, typically between the thumb and an opposing two fingers. This squeezing causes that (i) the workpiece is clamped between the two jaws simultaneously that (ii) both the vise member and the workpiece clamped therein slide toward the handle along the saw blade. This squeezing is against the force of the spring, which compresses. Upon a partial relaxation of the squeezing the sliding vise member reciprocally slides in the opposite direction (away from the handle) along the saw blade under force of the compressed spring. The workpiece remains clamped between the two jaws.

The sliding vise member and the clamped workpiece thus both reassume a position separated along the saw blade from the handle. In this position the vise member and workpiece clamped therein are ready for another sawing stroke.

The sliding vise member clamping the workpiece and the saw blade are capable of a slight lateral movement towards and away from each other, as well as the larger longitudinal movement of the sawstrokes. The saw blade is pressured laterally into the workpiece during a squeezing, power, sawstroke and is released laterally from the saw blade during the return sawstroke. The operation is facilitated by the natural curvature of the hand, which lends to draw a held item inward during grasping or squeezing, and to expel a held item during relaxation of the grip.

The saw may be repositioned any number of times to new purchases and/or alignments relative to the workpiece in order to permit progressive sawing, particularly of curves in substantially planar workpieces. Upon such time as the sawing is complete a total release of the squeezing force allows the jaws of the vise member to separate, permitting removal of the sawed workpiece parts from between the slack jaws.

The combination saw and vise tool of the present invention need not be used exclusively for sawing, but is adaptable for marking, scoring, slicing or otherwise altering a localized area of a workpiece. In particular, an elongate knife blade or an elongate file may substitute for the elongate saw blade in order to respectively slice or score a workpiece.

The sliding vise member of the combination saw and vise in accordance with the present invention preferably includes a spline between the two jaws for maintaining alignment of the jaws. The vise member further preferably includes a slip joint that permits separation of the jaws only so far as to receive the workpiece between the jaws while preventing that the jaws should become inappropriately widely separated, or completely disengaged one from the other. Each of the two jaws preferably presents a textured surface for gripping and holding the workpiece within the mouth of the sliding vise. This surface may have guide lines or grooves to facilitate precision placement of the workpiece, and a resultant precision miter saw cut.

The saw blade is preferably attached, and more preferably removably attached, to the fixed handle by a fastener, typically by a screw. The fixed handle and the innermost jaw of the vise which are located at opposite ends of the spring are each preferably permanently connected to this spring, preferably by embedding the spring ends within the typically plastic bodies of both the innermost jaw and the handle. By this construction the blade may be removably replaced while the handle and the innermost jaw remain connected (but not rigidly connected) by the spring. Meanwhile, the outermost jaw remains connected to the innermost jaw by the slip joint. Because all parts preferably remain connected even when the saw blade is removed it is substantially precluded that any parts should be lost.

An important further feature of both preferred embodiments of a hand-held combination saw and vise in accordance with the present invention is a raised structure presented upon that contoured, finger-engaging, surface of the outermost jaw. In one embodiment of the invention this raised structure is a rib. In the other embodiment it is a housing that surrounds the fingers. In either case the raised structure is normally symmetric relative to the two fingers. It is raised sufficiently above the contoured surface of the jaw so that it may be abutted against some external surface, such as a saw table, even while the two fingers are positioned upon the contoured surface for squeezing the jaw.

This construction permits a workpiece to be located and held in an alternative, second, position to its normal position between the jaws of the vise. This alternative workpiece position is between the raised structure of the outermost jaw and an external surface, such as the surface presented by a saw table. The external surface normally presents an aperture, or notch, that permits unrestricted motion of the reciprocating saw blade. The workpiece is held in this second position by pressure exerted upon it with the outermost jaw. While the workpiece is so held the saw is still readily operated by the opposed fingers and thumb of one hand, or alternatively by just the two fingers with the table substituting for the thumb, for sawing.

Still another important further feature is present within that one preferred embodiment of a hand-held combination saw and vise in accordance with the present invention wherein the outermost jaw's raised structure is in the form of a housing surrounding the two fingers. In this embodiment anther, like, housing also preferably exists upon the handle in position surrounding the thumb. At least one housing, and preferably both housings, present one or more external planar surfaces that are in precise angular relationship, typically 45°, to the flat plane of the saw blade. A selected one of these precisely angled external planar surfaces may be abutted against a reference plane, such as a tabletop. It may be maintained position while the saw is squeezed for sawing (necessarily making that the remaining one of the handle or sliding vise element is spatially moving). Meanwhile, the workpiece is also precisely positioned relative to the same reference plane. The net result of the precision angular positioning of both the saw and the workpiece is a miter saw cut of the workpiece at that precise angle, typically 45°, that the selected external planar surface exhibits relative to the flat plane of the saw blade. Effectively a "miter box" is created by referencing each of the saw and the workpiece relative to an external reference plane.

The combination saw and vise in accordance with the present invention is readily operated even by children and others of poor manual dexterity and/or strength to simultaneously (i) hold and (ii) saw materials with good precision and regular results. The materials sawed are typically lightweight, as besuits the limited strength and stamina of the hand, but, with appropriate saw blades, the saw is fully capable of cutting hard materials (especially those of modest dimensions) with exacting precision. Risk of injury from, or damage to, the saw blade is mitigated by its partial enclosure within the handle, spring, and sliding vise elements. A workpiece may readily be positioned at a range of angles both within the vise jaws, or outside of the vise and against the rib, in order to accomplish precision, miter, saw cuts. When used by a skilled, typically adult, operator, the combination saw and vise tool in accordance with the present invention readily produces precision sawcuts, or other cuts and marks, that are fully equivalent in quality to the cuts and marks produced by common jewelers, coping, keyhole, and like saws, knives, and files of the prior art.

BRIEF DESCRIPTION OF THE DRAWINGS

These and other aspects and attributes of the present invention will become increasingly clear upon reference to the following drawings and accompanying specification wherein:

FIG. 1 is a side view of a first preferred embodiment of a hand-held jigsaw-type combination saw and vise in accordance with the present invention.

FIG. 2 is a front view showing the first preferred embodiment of a combination saw and vise in accordance with the present invention.

FIG. 3 is an additional side view, similar to FIG. 1, showing the detail interior construction of the first preferred embodiment of the combination saw and vise in accordance with the present invention.

FIG. 4 is a side view of another, second, preferred embodiment of a combination saw and vise in accordance with the present invention.

FIG. 5 is a front view of the second preferred embodiment of a combination saw and vise in accordance with the present invention.

FIG. 6 is a partial illustration of the second preferred embodiment of a combination saw and vise in accordance with the present invention showing the handle abutted against a reference plane.

FIG. 7 is a side view of an alternative, knife, blade for use within the combination saw and vise in accordance with the present invention.

FIG. 8 is a side view of another alternative, file, blade for use within the combination saw and vise in accordance with the present invention.

DETAILED DESCRIPTION OF THE INVENTION

The present invention is embodied in a manually operated tool that is typically used for the light duty sawing of paper, cardboard, plastic, wood, foam board, and like materials. The tool may, however, be used for the precision manual sawing of difficult materials including metals. By use of different saw, knife, file, and marker blades the tool may be used to saw, cut, score, mark or otherwise alter localized areas of the surfaces of workpieces upon which the tool is used.

The saw tool includes an integral vise, or clamp, by which the workpiece material is normally held during sawing. The workpiece material may alternatively be held between an exterior of one jaw of the vise and an external surface such as a saw table. The saw is considered to be of the "jigsaw" type because the tip of the saw blade is exposed during sawing and use. Nonetheless to such exposure, the saw is relatively safe. It may readily be used to good result by hobbyists and children.

A first preferred embodiment combination jigsaw-type saw and vise 10 in accordance with the present invention is shown in side view in FIGS. 1 and 3 and in front view in FIG. 2. The combination saw and vise 10 has a saw blade 11 that is typically made of stainless steel with typically 6–20 teeth per inch along one operative, serrated, edge. The width X of the saw blade 11 is typically $\frac{3}{8}$". The thickness Y of saw blade 11 is typically $\frac{1}{8}$". The total length of the saw blade 11 is typically less than 6", or less than the thumb to fingertip span of the adult human hand. If the saw is to be used on hard or other difficult materials, then the saw blade 11 is made of appropriate metals and/or ceramics, and exhibits appropriate properties for slow speed, manual, sawing.

A handle 12, typically made of molded plastic, is affixed, typically by a fastener 13 which is more typically a stainless steel set screw, at one end of the saw blade 11. The handle 12 is sized and contoured to present a surface 14, best observable in FIG. 2, which is adapted to serve as a secure rest to a human digit, normally the thumb 50 (shown in light line). Alternatively, the saw may rest against a support surface 70 such as a bench or tabletop. The handle 12 may optionally affix, normally by embedding within the plastic structure of the handle, a guard ring 60 (typically made of metal) within which the thumb 50 slips. The guard ring 60, and counterpart guard rings 61 (to be discussed) are particularly useful for bidirectional sawing, and for the sawing of difficult materials. In such sawing it is desirable to pull on the handle 12 (and the saw blade 11 to which such handle 12 is attached) through ring 60, as well as to push on handle 12 at the contoured surface 14.

A coil spring 15, typically made of stainless spring steel, fits coaxially around saw blade 11 between handle 12 and inner jaw 22 to sliding vise member 20. The spring 15 is typically permanently affixed (but need not be so affixed) to both handle 12 and to inner jaw 22, normally by embedding the end of spring 15 within the plastic from which the handle 12 and inner jaw 22 are typically constructed.

The sliding vise member 20 consists of inner jaw 22 and outer jaw 21. Both jaws 21, 22 are typically constructed from plastic or nylon. Both jaws 21, 22 slide freely on saw blade 11 which passes through an appropriately sized and contoured internal rectangular cross-section bore 28 within each. Each of the jaws 21, 22 has a non-slip interior surface 23 that is adapted for contacting and frictionally holding a workpiece 30 (shown in light line) of various materials and dimensions. The jaws 21, 22 are maintained in alignment, with their gripping surfaces 23 substantially spaced parallel, by internal spline 24. The jaws 21, 22 also each have an extension of complementary configuration to that upon the other jaw which is snapped to the corresponding extension upon the other jaw in order to form slip joint 25. Slip joint 25 permits the jaws 21, 22 to be separated along their surfaces 23 from 0 to typically 1" maximum range. However, the jaws 21, 22 are not capable of being completely separated from one another unless the complementary members forming slip joint 25 are intentionally pried apart (an abnormal occurrence).

The bore 28 is slightly wider than the saw blade 11. The vise member 20 may thus rock slightly upon the elongate saw blade 11, and move laterally (as well as longitudinally) thereto. A typical amount of lateral play is 1/16". The amount of lateral play of saw blade 11 within bore 28 is generally less if the teeth 16 of the saw blade 11 are small and shallow as besuits a hard, typically metal, workpiece 30. Conversely, the amount of lateral play of saw blade 11 within bore 28 is generally greater if the teeth 16 of saw blade 11 are large and deep as besuits a soft, typically wood, workpiece 30. The amount of lateral play within bore 28 may be, particularly in highest quality versions of the saw and vise 10 that are completely made of metal, adjusted by shims (not shown) or by a screw or thumbscrew (not shown) that threads a one of the jaws 21, 22 in a threaded bore perpendicular to the bore 28, from the direction of slip joint 25, and within the plane of saw blade 11.

The outer jaw 21 presents, at a location oppositely from its interior gripping surface 23 and from the handle 12, a finger rest surface 26 (best observable in FIG. 2). The surface 26 is contoured and adapted for receipt of human digits, nominally a two fingers 51 which are disposed oppositely to thumb 50. As with the optional surrounding of thumb 50 by optional guard ring 60, the fingers 51 may likewise optionally be surrounded by optional guard rings 61. The optional guard rings 61 (shown in dashed line) are typically made of metal. They are affixed to the body of outer jaw 21, typically by being molded within the plastic material of such jaw.

Finally, and importantly, the outer jaw 21 possesses a raised structure above its finger rest surface 26. This structure is preferably in the form of central rib, or projection, 27 although it may assume other forms. This projection 27 is of greater, or equal, height to either the extension of fingers 51 above finger rest surface 26, or to the extension of optional finger guard rings 61 if such are employed. The projection 27 is at the furthest extent of jaw 21 from handle 12.

The combination jigsaw-type saw and vise 10 in accordance with the present invention supports at least two separate and independent operational modes for sawing a workpiece. In a first operational mode, the combination saw and vise 10 is gripped between the thumb 50 and opposed fingers 51 of a human hand, and, while the grip is relaxed, the workpiece 30 is slid between the gripping surfaces 23 of jaws 21, 22. Although it is typical to so insert the workpiece 30 into this position by a coordinated use of the remaining hand to that hand holding the saw and vise 10, it is actually possible for a person possessing only one hand to load a workpiece into the combination saw and vise 10. This one-handed loading is by manipulation of the workpiece against an external surface, or by manipulation with the remaining fingers of the same hand. Workpiece 30 need not be inserted perpendicular to the flat surface of saw blade 11 (as illustrated), but can be oriented at any desired angle at which a saw cut is desired to be made.

The combination saw and vise 10 is actuated for sawing by forcibly squeezing and compressing the thumb 50 toward the opposed fingers 51. The squeezing transpires both against the frictional force caused by saw blade 11 sawing into workpiece 30, and against the compression force of spring 15. The compression stroke has a tendency, due to the arc of the hand, to force the saw blade 11 into good and regular sawing contact against workpiece 30. A more powerful squeeze will take a bigger bite sawing more, and a more gentle squeeze will take a smaller bite sawing less—precisely as desired. Each time the grip is relaxed the saw blade 11 will tend to spring backwards within the bore of jaws 21, 22 and away from the workpiece 30. While the saw blade 11 encounters low frictional resistance against the workpiece 30 the spring 15 will decompress, causing the handle 12 to return to full separation from jaws 21, 22, thereby preparing for a subsequent sawing stroke.

The interaction between holding and sawing is subtle, and elegant. The workpiece 30 may be held within the bore of jaws 21, 22 at a position separated from saw blade 11, and not shown. Whether held in position for sawing or not, at a sufficient extension of jaws 21, 22 from handle 11 the spring 15 is no longer operative to cause the jaws 21, 22 to clamp workpiece 30 (indeed, the spring 15 may commence to pull inner jaw 22 away from outer jaw 21), and the workpiece 30 may be dropped away from the saw and vise 10 under force of gravity. Conversely to the holding of a workpiece that is not sawed, the handled saw blade 11 may be independently used to saw a workpiece 31 (shown in FIG. 3) that is not held—as explained below. The interaction between holding and sawing is generally such that sawing operations can be accomplished well with one hand only in extremely difficult positions, such as the sawing of cables or pipes on submarines or other ships while the person doing the sawing hangs upside down by his/her heels in extremely cramped quarters such as behind switchboards and other equipments.

Variations in the construction and use of the combination saw and vise 10 in accordance with the present invention are readily accomplishable. If the workpiece 30 that is located between the gripping surfaces 23 of jaws 21, 22 is of an especially tough material, then it may be intentionally further pressured into strong contact with reciprocating saw blade 15. This may be accomplished by draping the fingers 51 substantially over the finger rest surface 26 of outer jaw 21 and pulling the workpiece 30 into contact with blade 15 by exerting pressure with the fingertips. If the workpiece 30 is very large and extensive—such as a planar sheet of cardboard, wood, plastic, or the like—then the combination saw and vise 10 may be progressively urged into such workpiece during the relaxed portion of the sawing stroke. Alternatively, the workpiece may be progressively fed into contact with the saw. Because the combination saw and vise 10 is well balanced, and because it is harmonious in the cooperative interaction of its saw and sliding vise member parts, all such progressive workpiece feeding, gripping, and sawing may readily be accomplished with but a single hand if so desired.

It is also possible that the primary cutting that is accomplished by saw blade 15 may be reversed so as to occur on the extension as opposed to the compression stroke. It is alternatively possible that the cutting may be substantially bidirectional. In each case the saw blade 11 is provided with teeth appropriate to the direction(s) in which it cuts. Next, in the event that cutting is to be accomplished during the extension of handle 12 from sliding member 20, the force of spring 15 is preferably made to be large. Optional thumb ring 60 and finger rings 61 permit the opposed thumb 50 and fingers 51 to exert a spreading force to aid in pulling fixed handle member 12 apart from sliding handle member 20. By the combination of spring 15 and finger forces, sawing may be accomplished during the extension stroke. Normally, however, the musculature of the human hand is more powerful for exerting a compressive, gripping, force than for exerting an extension, spreading, force between an opposed finger and thumb pair. Consequently, the saw blade 15 preferably exhibits teeth which cut primarily during the compression stroke, as illustrated in FIG. 1.

The combination saw and vise 10 in accordance with the present invention supports a second, separate and independent, operational mode for sawing a workpiece. Particularly, a workpiece 31 may be held in position abutted against a surface 40, nominally a saw table surface, as illustrated in FIG. 1. In such position the workpiece 31 is contacted by the central rib, or projection, 27 to outer jaw 21. This occurs even while the fingers 51 rest upon the finger rest surface 26 of the outer jaw 21. The thumb 50 acting against surface 14, or the fingers 51 acting against optional guard rings 61, or both the thumb 50 and fingers 51, are used to constantly pressure the entire combination saw and vise 10 into workpiece 31, thereby constantly holding it against saw table surface 40. The saw table surface 40 preferably has a notch, hole, or aperture in order to permit ready passage of the saw blade 15 during the sawing operation.

Operation of the saw and vise 10 in this manner is the reverse of a normal jigsaw; the body of the saw (acting through rib 10) pressures the workpiece 31 into contact against the saw table 40, as opposed to the normal jigsaw operation wherein the workpiece is elsewise fixedly held into contact with the saw table (as with the other hand or "C" clamps) and the saw is brought to the workpiece (and the saw table to which it is held). This difference is subtle, but exists even if the vertical orientation of combination saw and vise 10, workpiece 30, and saw table 40 is reversed from that vertical orientation illustrated in FIG. 1. Operation of the saw and vise 10 upon workpiece 31 (in any spatial orientation) should be compared with operation of a normal jigsaw wherein the sole plate of the jigsaw is indisputably brought into contact with the workpiece, but is not pressured to fixedly hold the workpiece (else how could sawing proceed?). Of course the saw and vise 10 must be progressively worked into the workpiece 31 for sawing similarly to a normal jigsaw. However, the progressive working that transpires with the saw of the present invention during a manual extension stroke lasting several seconds is entirely unlike the continuous urging normally accompanying power jigsawing, or the forced stroke into a positionally held workpiece that accompanies manual sawing. It is highly unusual for a workpiece to be held by a part of the saw—either by a vise integral to the saw or by continuous pressured contact against a part of the saw.

Nonetheless to the different operation of the combination saw and vise in accordance with the present invention, the results obtained are excellent. The workpiece may be accurately and precisely cut at any desired angle. As in the first operational mode, in the second operational mode the sawing operation may also be substantially accomplished with but a single hand. The sawing may readily be performed to good results by children, physically handicapped persons, or others lacking manual strength and/or dexterity. The saw may be used in difficult positions, such as to cut cable and wire in positions of poor accessibility behind equipments and switchboards on ships, aircraft, and submarines.

The entire combination saw and vise 10 is corrosion resistent and durable. Its plastic or nylon parts may be brightly colored. The saw and vise 10 is reasonably safe. The tip of saw blade 10 may be made blunt, without saw teeth in the tip region, and/or the tip may be surrounded by a small plastic tip cap. The only part subject to appreciable wear is the saw blade, and it is replaceable. The saw and vise 10 may be inexpensively made and assembled by labor of low skill level. Like most tools it may be constructed at different quality levels, including at high quality where it is especially useful for field cutting of wire and cable.

A second preferred embodiment of the combination saw and vise 100 in accordance with the present invention is shown in FIGS. 4–6. Handle 120 now defines an integral thumb hole 121 and beveled exterior planar surfaces 122–124. Angles A, B, C need not be equal, but each is typically 45° relative to saw blade 11. The location of set screw 130 is now in a bore 125 to handle 120, and against the narrow edge of saw blade 11. Similarly, sliding vise member 200 defines, particularly in the element of outer jaw 210, integral finger holes 211 and beveled exterior planar surfaces 212–214. Angles D, E, F need not be equal, but each is typically 45° relative to saw blade 11.

The angled planar exterior surfaces 122–124 to handle 120, and surfaces 212–214 to exterior jaw 210 of sliding vise member 210, permit the combination saw and vise 100 to be precisely oriented relative to a reference plane, for example table top 700 shown in FIG. 6. If a workpiece (not shown) is likewise oriented relative to the same reference plane then sawing may proceed at a precision angle. A miter cut is thereby accomplished.

In accordance with preceding discussion, certain modifications to either preferred embodiment of the combination saw and vise in accordance with the present invention will readily suggest themselves to a practitioner in the art of tool design. It may be envisioned that the sliding vise member 20 could be adapted to function as a miniature miter box in addition to its clamping function. In its simplest form the non-slip surfaces 23 could be provided with grooves or other features supporting the precision alignment of workpiece 30 against the saw blade 15. Similarly, the outermost surface of central rib, or projection, 27 could also present small angled grooves. These grooves would be suitable for precision angular alignment of a small cylindrical workpiece 31 such as a dowel. As further modification toward realizing a miter box function, the sliding vise member 20 could have of an interior bore 28 which would receive the saw blade 11 only at certain fixed angles. Consider that in the preferred embodiment apparatus of the invention the saw blade is received within a complimentary rectangular cross-section bore 28 of sliding vise member 20 at a fixed orientation relative to jaw surfaces 23. By the use of a bore of star-shaped cross-section, the saw blade could be insertable within the bore at other particular, predetermined, angles. When so inserted the saw blade 11 would present a precise angle of cut relative to a workpiece 30 which would be maintained in fixed alignment with jaws 21, 22.

Still other variations and adaptations of the present invention are possible. It would be possible to use more than one spline 24, possibly positioned to the side of saw blade 15 and between jaws 21, 22, in order to impart still further precise dimensional stability. Mechanical features other than a slip joint 25, such as a simple string, are readily implementable by practitioners of the mechanical arts in order to achieve the mechanical purpose of establishing a minimum and a maximum separation between two movable elements. The spring 15 need not have been located coaxially around blade 11, but could have been displaced therefrom. More than one spring could have been used. The blade 11 could exhibit teeth on both sides, and could be reversible within the sliding handle member 20. By the selection of one side of the blade 11 a particular set of saw teeth could be applied to workpiece 30 in accordance with the different materials of its construction.

It is even possible to substitute blades of alternative types for toothed saw blade 11. A knife blade 17 shown in FIG. 6 and a file blade 18 shown in FIG. 8 may be readily attached and detached. Various types of knife, file, and marker blades support cutting, scoring, marking and otherwise altering the surface of workpiece 30.

In accordance with these and other obvious variations, the scope of the present invention should be interpreted in accordance with the language of the following claims, only, and not solely in accordance with that preferred embodiment combination saw and vise within which the present invention has been taught.

What is claimed is:

1. A saw comprising:
    a saw blade;
    a handle member, adapted and conformed to engage a saw user's first finger, fixed at one end of the saw blade for imparting motion thereto under force of the first finger;
    a sliding vise member, having two jaws a one of which that is located most remotely from the handle member being adapted and conformed to engage a saw user's one or more second fingers opposed to the first finger, for sliding along the saw blade toward the handle member in response to a squeezing force developed between the first finger and the one or more second fingers opposed thereto, and for holding in response to the same squeezing force a workpiece clamped between its two jaws and in contact with the saw blade during the sliding;
    a force biasing means, located between the handle member and a most proximately located one of the vise's two jaws, for positionally force biasing the fixed handle member and the sliding vise member to separation and for communicating the squeezing force from the handle member to the most proximately located one of the vise's two jaws;
    wherein the squeezing force overcomes the biasing in order to move the fixed handle member toward the sliding vise member, therein sawing the workpiece clamped between the vise's two jaws by action of the same squeezing force;
    wherein the force biasing means operates for positionally force biasing the fixed handle member and the sliding vise member to separation only over a limited distance;
    wherein the sliding vise member's two jaws are clamped together by action of the force biasing means forcing against a one of the vise's two jaws in opposition to a force from the one or more second fingers acting upon the other one of the vise's two jaws in order to hold the workpiece by gripping the workpiece between the two jaws within the limited distance; and
    wherein the sliding vise member's two jaws are not clamped together by action of the force biasing means outside the limited distance, therein permitting that the saw user may readily insert the workpiece between the vise member's two jaws when the sliding vise member is separated from the fixed handle member by more than the limited distance.

2. The saw according to claim 1
    wherein each of the vise member's two jaws has a textured surface for securely gripping the workpiece.

3. The saw according to claim 1 wherein the sliding vise member further comprises:
    a spline for keeping the two jaws aligned in their variable separation.

4. The saw according to claim 3 wherein the sliding vise member further comprises:
    a slip joint for preventing that the two jaws should separate so far that the key of the spline should disengage from the keyway of the spline.

5. A hand-held tool for use by a user having fingers in order to forcibly physically alter a localized area of workpiece, the tool comprising:
    an elongate member having an edge suitable to physically alter a localized area of a workpiece when drawn forcibly in the direction of its longitudinal axis along the localized area of the workpiece;
    a handle member fixed at one end of the elongate member and defining an aperture for engaging the user's thumb in order to impart longitudinal motion to the blade member under force of the thumb;
    a vise member constrained for sliding movement longitudinally along the elongate member between positions relatively more and relatively less proximate to the handle member, the vise member having two opposed jaws adapted and conformed for clamping a workpiece upon such times as the jaws are forced together, the vise member being capable of sufficient lateral movement relative to the elongate member so that the workpiece clamped between the jaws may selectively move into forcible contact with the edge of the elongate member during the sliding movement, a one of the vise member's two opposed jaws that is most distant from the handle member longitudinally along the elongate member defining an aperture for engaging the user's finger that is opposed to the user's thumb;

a force biasing means, located between the handle member and a remaining one of the vise member's two jaws that is most proximate to the handle member longitudinally along the elongate member, for positionally force biasing this remaining one of the vise member's two jaws and the handle member to separation;

wherein a squeezing force between the user's thumb and opposed finger overcomes the force biasing of the force biasing means, and slides the vise member along the elongate member simultaneously that the vise member's two jaws are forced together clamping the workpiece simultaneously that the entire vise member and the workpiece clamped therein may selectively more laterally relative to the elongate member so that the workpiece selectively moves into forcible contact with the edge of the elongate member, therein altering a localized area of the workpiece.

6. A hand-held tool for use by a user having fingers in order to forcibly physically alter a localized area of workpiece, the tool comprising:

an elongate member having an edge suitable to physically alter a localized area of a workpiece when drawn forcibly in the direction of its longitudinal axis along the localized area of the workpiece;

a handle member fixed at one end of the elongate member and engaging the user's first finger in order to impart longitudinal motion to the elongate member under force of the first finger, the handle member comprising:

a housing receiving the first finger into an orifice defined by the housing for engagement thereof, and defining and presenting at least one external planar surface that is of precisely predetermined angle relative to the longitudinal axis of the elongate member;

a vise member constrained for sliding movement longitudinally along the elongate member between positions relatively more and relatively less proximate to the handle member, the vise member having two opposed jaws adapted and conformed for clamping a workpiece upon such times as the jaws are forced together, the vise member being capable of sufficient lateral movement relative to the elongate member so that the workpiece clamped between the jaws may selectively move into forcible contact with the edge of the elongate member during the sliding movement, a one of the vise member's two opposed jaws that is most distant from the handle member longitudinally along the elongate member being adapted and conformed to engage one or more second fingers of the use that are opposed to the user's first finger;

a force biasing means, located between the handle member and a remaining one of the vise member's two jaws that is most proximate to the handle member longitudinally along the elongate member, for positionally force biasing this remaining one of the vise member's two jaws and the handle member to separation;

wherein a squeezing force between the user's thumb and one or more opposed fingers overcomes the force biasing of the force biasing means, and slides the vise member along the elongate member simultaneously that the vise member's two jaws are forced together clamping the workpiece simultaneously that the entire vise member and the workpiece clamped therein may selectively move laterally relative to the elongate member so that the workpiece selectively moves into forcible contact with the edge of the elongate member, therein altering a localized area of the workpiece.

7. A hand-held tool for use by a user having fingers in order to forcibly physically alter a localized area of workpiece, the tool comprising:

an elongate member having an edge suitable to physically alter a localized area of a workpiece when drawn forcibly in the direction of its longitudinal axis along the localized area of the workpiece;

a handle member fixed at one end of the elongate member for engaging a user's first finger in order to impart longitudinal motion to the blade member under force of the first finger;

a vise member constrained for sliding movement longitudinally along the elongate member between positions relatively more and relatively less proximate to the handle member, the vise member having two opposed jaws adapted and conformed for clamping a workpiece upon such times as the jaws are forced together, the vise member being capable of sufficient lateral movement relative to the elongate member so that the workpiece clamped between the jaws may selectively move into forcible contact with the edge of the elongate member during the sliding movement, a one of the vise member's two opposed jaws that is most distant from the handle member longitudinally along the elongate member comprising:

a housing receiving the user's second finger into an orifice defined by the housing for engagement thereof, and defining and presenting at least one external planar surface that is at a precisely predetermined angle relative to the longitudinal axis of the elongate member and that does not intersect the held workpiece; and a force biasing means, located between the handle member and a remaining one of the vise member's two jaws that is most proximate to the handle member longitudinally along the elongate member, for positionally force biasing this remaining one of the vise member's two jaws and the handle member to separation;

wherein a squeezing force between the user's first and opposed second finger overcomes the force biasing of the force biasing means, and slides the vise member along the elongate member simultaneously that the vise member's two jaws are forced together clamping the workpiece simultaneously that the entire vise member and the workpiece clamped therein may selectively move laterally relative to the elongate member so that the workpiece selectively moves into forcible contact with the edge of the elongate member, therein altering a localized area of the workpiece.

* * * * *